(12) United States Patent
Feng et al.

(10) Patent No.: US 10,069,848 B2
(45) Date of Patent: Sep. 4, 2018

(54) METHOD AND SYSTEM FOR DATA SECURITY

(71) Applicant: International Business Machines Corporation, Armonk, NY (US)

(72) Inventors: Hao Feng, Beijing (CN); Hui Hui Jiang, Beijing (CN); Shuo Li, Beijing (CN); Shengyan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/741,659

(22) Filed: Jun. 17, 2015

(65) Prior Publication Data

US 2016/0080396 A1 Mar. 17, 2016

(30) Foreign Application Priority Data

Sep. 12, 2014 (CN) .......................... 2014 1 0462902

(51) Int. Cl.
*H04L 29/06* (2006.01)
*G06F 21/55* (2013.01)

(52) U.S. Cl.
CPC ........ *H04L 63/1408* (2013.01); *G06F 21/552* (2013.01); *H04L 63/1416* (2013.01)

(58) Field of Classification Search
CPC ........................ H04L 63/1408; H04L 63/1416
See application file for complete search history.

(56) References Cited

U.S. PATENT DOCUMENTS

| | | | |
|---|---|---|---|
| 7,752,215 B2 | 7/2010 | Dettinger et al. | |
| 7,904,454 B2 | 3/2011 | Raab | |
| 8,321,387 B2 | 11/2012 | Dettinger et al. | |
| 8,838,556 B1 * | 9/2014 | Reiner | G06F 17/30994 707/694 |
| 9,047,463 B2 * | 6/2015 | Porras | G06F 21/53 |
| 9,106,687 B1 * | 8/2015 | Sawhney | H04L 63/1416 |
| 9,268,947 B1 * | 2/2016 | Jarlstrom | G06F 21/6218 |
| 2007/0240203 A1 * | 10/2007 | Beck | G06F 19/322 726/4 |
| 2008/0172737 A1 * | 7/2008 | Shen | G06F 21/6245 726/21 |

(Continued)

FOREIGN PATENT DOCUMENTS

WO 2013072930 A3 5/2013

OTHER PUBLICATIONS

Anonymous, "A Method to Mining Related Database Sensitive Object," An IP.com Prior Art Database Technical Disclosure, Mar. 12, 2014, p. 1-4, IP.com No. 000235610.

(Continued)

*Primary Examiner* — Eleni A Shiferaw
*Assistant Examiner* — Hee K Song
(74) *Attorney, Agent, or Firm* — Erik K. Johnson; Reza Sarbakhsh

(57) ABSTRACT

A method for data security is provided. The method may include obtaining a first object which is set as a sensitive object. The method may also include obtaining a second object, whereby there is a first relationship between the second object and the first object. The method may further include setting the second object as a sensitive object, in response to determining that the first relationship represents that there is strict correlation between the second object and the first object.

20 Claims, 3 Drawing Sheets

(56) References Cited

U.S. PATENT DOCUMENTS

| | | | |
|---|---|---|---|
| 2012/0137375 A1* | 5/2012 | Ramachandran | H04L 63/105 726/28 |
| 2012/0291138 A1* | 11/2012 | Haga | G06F 21/51 726/27 |
| 2013/0124546 A1* | 5/2013 | Wormley | H04L 63/101 707/758 |
| 2013/0332891 A1* | 12/2013 | Schmitlin | G06F 3/0484 715/853 |
| 2014/0007184 A1 | 1/2014 | Porras | |
| 2014/0130153 A1 | 5/2014 | Dolby et al. | |
| 2014/0282848 A1* | 9/2014 | Patwardhan | H04L 63/20 726/1 |
| 2015/0058997 A1* | 2/2015 | Lee | G06F 9/45558 726/26 |
| 2015/0088841 A1* | 3/2015 | Fuglsang | G06F 17/30303 707/692 |
| 2015/0089574 A1* | 3/2015 | Mattsson | G06F 17/30315 726/1 |
| 2016/0070905 A1* | 3/2016 | Antoun | G06F 21/50 726/1 |

OTHER PUBLICATIONS

Feng et al., "Method and System for Data Security," English Translation Application and Drawings, Filed on Sep. 12, 2014, p. 1-17, China Patent Application Serial No. 201410462902.7.

* cited by examiner

METHOD AND SYSTEM FOR DATA SECURITY

BACKGROUND

The present invention relates to data security, and more specifically, the present invention relates to a method and system for data security.

Data security is very critical in daily operation of an informationized enterprise. If data is maliciously tampered or destroyed, it may cause irretrievable loss to the enterprise. To improve data security, often there is a need to set some data security policies to monitor and protect data. As amount of enterprise data increases, how to monitor and protect data becomes particularly important. In a current big data environment, how to rapidly and effectively monitor and protect ever increasing data becomes an important problem faced by current data security field.

SUMMARY

In view of the afore-mentioned problem existed in the art, the present invention sets forth a method and system for data security.

According to an illustrative embodiment of the present invention, there is provided a method for data security, including obtaining a first object which is set as a sensitive object. Also included is obtaining a second object, whereby there is a first relationship between the second object and the first object. Further included is setting the second object as a sensitive object, in response to determining that the first relationship represents that there is strict correlation between the second object and the first object.

According to an illustrative embodiment of the present invention, there is provided a system for data security, including an obtaining unit configured to obtain a first object which is set as a sensitive object, and obtain a second object, whereby there is a first relationship between the second object and the first object. Also included is a determining unit configured to set the second object as a sensitive object in response to determining that the first relationship represents that there is strict correlation between the second object and the first object.

With the method and system of the illustrative embodiments, fast and effective monitoring and protection of data may be achieved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
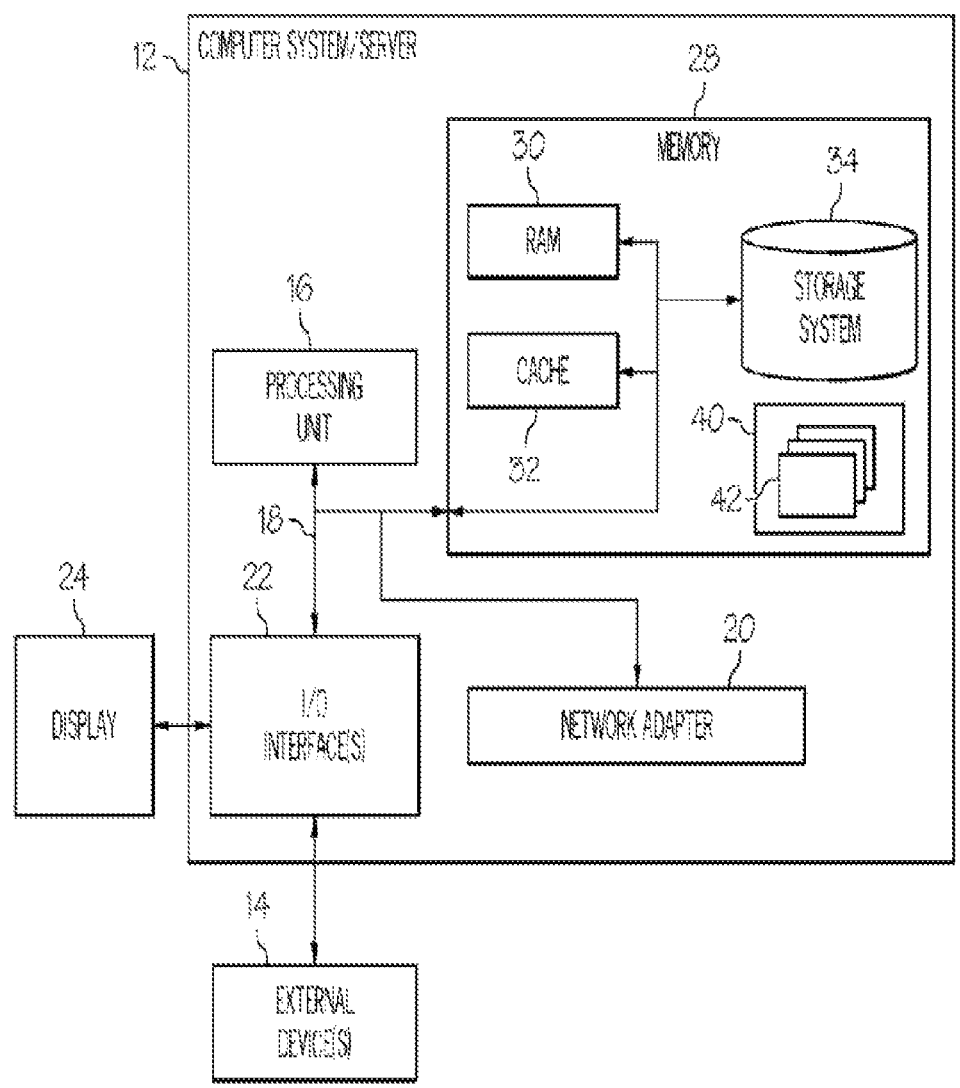
FIG. 1 shows a block diagram of an exemplary computer system/server 12 which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In addition to the traditional computer system/server 12 shown in FIG. 1, an implementation applicable to implement the present invention may also include a mobile electronic device, which includes but not limited to a mobile phone, a PDA, a tablet computer, etc. Typically, the mobile electronic device has an input device, which includes but not limited to a touch input device such as a touch screen, a touchpad, etc.

Figure 2:
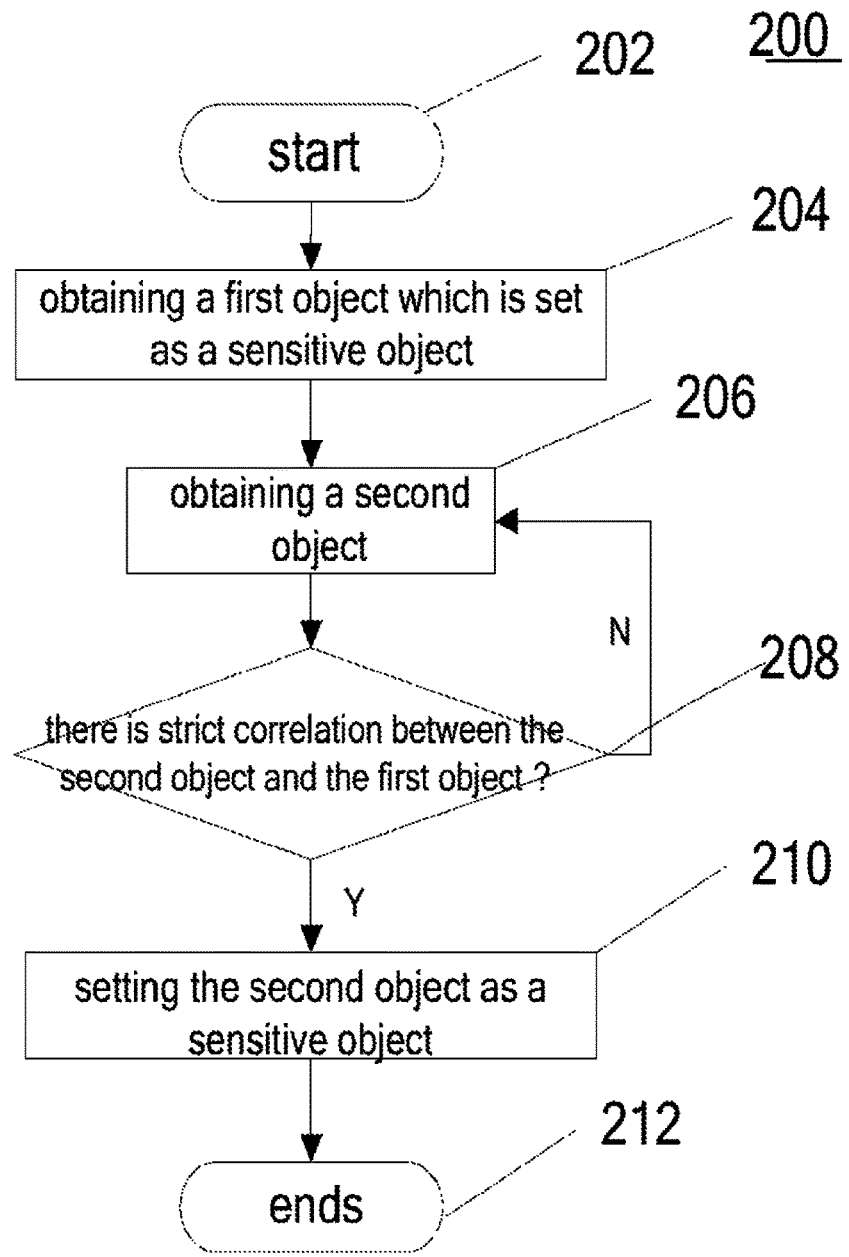
FIG. 2 shows a flowchart of a method 200 for data security according to one embodiment of the present invention.

Referring to FIG. 2 below, a flowchart of a method 200 for data security according to one embodiment of the present invention is shown. The method 200 starts from step 202.

Then, the method 200 proceeds to step 204, obtaining a first object which is set as a sensitive object. The sensitive object refers to that the object is sensitive for data security. According to an embodiment of the present invention, the first object which is set as a sensitive object includes but not limited to one or more of the objects listed below:

1) a user in a specific user group: such as a user in a user group which has write operation permission in a Microsoft® Window® operating system, or a user in a database administrator user group of a database management system, or a root user of a Unix® operating system, etc.;

2) a specific file of a file system: such as a dynamic link library file (extension thereof is *.dll) under path \Windows\ of a Microsoft® Window® operating system, or a file in a root directory of a Unix® operating system, etc.;

3) specific content in a database:

for a database stored in form of data sheet, the specific content may be a specific data sheet, a data column, or a data row. For example, a staff information data sheet which records staff information of an enterprise, or sequence numbers and salaries (a data column) of staffs in the staff information data sheet, or all staff information (a data row) of specific staffs in the staff information data sheet;

for a database stored in form of markup language, the specific content may be a specific data node, such as certain important resource (usually identified by URI) in an extensible markup language (XML) document; etc.

Forms of the first object which is set as a sensitive object are given above merely by manner of examples. It should be appreciated that, the first object may also be any other possible forms existed in the art.

Then, the method 200 proceeds to step 206, obtaining a second object, wherein there is a first relationship between the second object and the first object. The first relationship may be a relationship in any form, for example:

1) the second object and the first object are located in a same specific user group;

2) the second object is created based on the first object;

3) the second object and the first object are located in a same data sheet;

4) the second object loads the first object;

5) the second object and the first object have a same root node; etc.

According to one embodiment of the present invention, the first relationship described above may be obtained by analyzing the second object and the first object. For instance, it is judged whether the first object and the second object are located in a same specific user group. Or, it is judged whether the second object and the first object are located in a same data sheet. Or, whether the second object contains the first object, etc. According to one embodiment of the present invention, the second object may be dynamically obtained from the first object via the first relationship. For instance, the second object is dynamically obtained by loading the first object. Or, the second object is dynamically obtained by referencing the first object. Or, the second object is dynamically created based on the first object, etc.

Then, the method 200 proceeds to step 208, determining whether the first relationship represents that there is strict correlation between the second object and the first object. According to an embodiment of the present invention, strict correlation includes but not limited to one or more of the following:

1) create relationship: namely, the second object is created based on the first object. For example:

the first object is a user A in an administrator user group of a Microsoft® Window® operating system, and the second object is a user B created based on the user group to which the user A belongs;

the first object is a staff information data sheet which records staff information of an enterprise, and the second object is created according to the staff information data sheet (which may be created by selecting partial content of the staff information data sheet, or by exporting partial content of the staff information data sheet, or by importing other data into the staff information data sheet);

the first object is a staff information data sheet which records staff information of an enterprise, and the second object is a view created according to the staff information data sheet.

2) load relationship: namely, the second object loads the first object. For example:

the first object is a dynamic link library file in folder Windows in a Microsoft® Window® operating system, and the second object loads that dynamic link library file;

the first object is a staff information data sheet which records staff information of an enterprise, and the second object loads entire or partial content of the staff information data sheet.

3) reference relationship: namely, the second object references the first object. For example:

the first object is a resource (usually stored in form of URI) in a XML document, and the second object is another XML document referencing that resource.

Examples of strict correlation are given above merely in form of illustrations. It should be appreciated that, the strict correlation may also be any other possible relationship in the art, as long as the relationship makes that the second object should also be set as a sensitive object on the premise that the first object is set as a sensitive object.

Then, the method 200 proceeds to step 210, setting the second object as a sensitive object, in response to determining that the first relationship represents that there is strict correlation between the second object and the first object. In response to determining that the first relationship represents that there is no strict correlation between the second object and the first object, the method 200 returns to step 206 to continue to obtain the second object.

Then, after all the second objects have been processed, the method 200 proceeds to step 212 and ends.

The method for data security according to embodiments of the present invention judges, based on a set sensitive object, whether there is strict correlation between other object and the sensitive object, and set an object having strict correlation as a sensitive object as well, thus, fast and effective monitoring and protection of data can be achieved, thereby well solving the problem existed in the art.

According to one embodiment of the present invention, the method for data security further comprising: in response to setting the second object as a sensitive object, updating a list of monitored sensitive objects. For instance, in response to detecting an operation on a sensitive object, warning information is displayed. Here, the operation on the sensitive object includes but not limited to one or more of the following:

1) access: including read, copy, and reference the sensitive object, and the like;
2) modify: including modify name and content of the sensitive object, etc.;
3) delete: including delete the sensitive object.

Examples of the operation on the sensitive object are given above merely in form of illustrations. It should be appreciated that, the operation on the sensitive object may also include any other possible form. For instance, a new object is created by utilizing the sensitive object, or the sensitive object is merged with other object, etc.

According to one embodiment of the present invention, the method for data security further comprising: in response to detecting an operation on the sensitive object, preventing the operation on the sensitive object.

Figure 3:
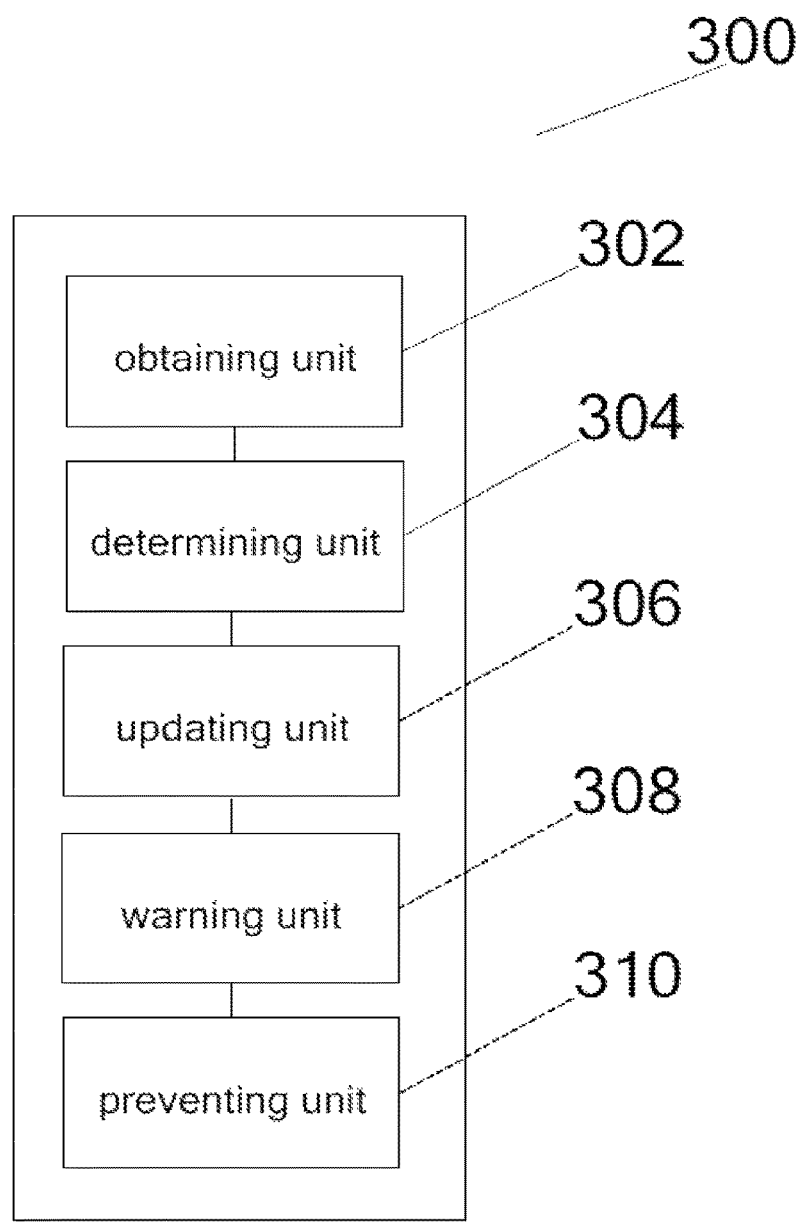
FIG. 3 shows a block diagram of a system 300 for data security according to one embodiment of the present invention.

Referring to FIG. 3 below, a block diagram of a system 300 for data security according to one embodiment of the present invention is shown. The system 300 comprising: an obtaining unit (i.e., module) 302 configured to obtain a first object which is set as a sensitive object, and obtain a second object, wherein there is a first relationship between the second object and the first object; a determining unit 304 configured to set the second object as a sensitive object in response to determining that the first relationship represents that there is strict correlation between the second object and the first object.

According to an embodiment of the present invention, strict correlation includes but not limited to one or more of the following:

1) create relationship: namely, the second object is created based on the first object.
2) load relationship: namely, the second object loads the first object.
3) reference relationship: namely, the second object references the first object.

Examples of strict correlation are given above merely in form of illustrations. It should be appreciated that, the strict correlation may also be any other possible relationship in the art, as long as the relationship makes that the second object should also be set as a sensitive object on the premise that the first object is set as a sensitive object.

According to one embodiment of the present invention, the system 300 further comprises an updating unit 306 configured to update a list of monitored sensitive objects in response to setting the second object as a sensitive object.

According to one embodiment of the present invention, the system 300 further comprises a warning unit 308 configured to display warning information in response to detecting an operation on the sensitive object. Here, the operation on the sensitive object includes but not limited to one or more of the following:

1) access: including read, copy, and reference the sensitive object, and the like;
2) modify: including modify name and content of the sensitive object, etc.;
3) delete: including delete the sensitive object.

Examples of the operation on the sensitive object are given above merely in form of illustrations. It should be appreciated that, the operation on the sensitive object may also include any other possible form. For instance, a new object is created by utilizing the sensitive object, or the sensitive object is merged with other object, etc.

According to one embodiment of the present invention, the system 300 further comprises a preventing unit 310 configured to prevent the operation on the sensitive object.

The method and system for data security according to embodiments of the present invention have been described above in conjunction with drawings. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ etc., and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data security, comprising:
   obtaining, from a database stored in markup language, a first object which is set as a sensitive object, wherein the first object is a resource in a first extensive markup language (XML) document and comprises a uniform resource identifier (URI) that is associated with the resource in the first extensive markup language (XML) document;
   obtaining a second object, wherein the second object comprises at least a second extensive markup language (XML) document, and determining whether there is a relationship between the first object and the second object; and
   setting the second object as a sensitive object based on the first object being set as a sensitive object and in response to determining that the relationship represents that there is strict correlation between the second object and the first object, wherein the strict correlation comprises the second object referencing the first object.

2. The method of claim 1, further comprising:
   in response to setting the second object as a sensitive object, updating a list of monitored sensitive objects.

3. The method of claim 2, further comprising:
   in response to detecting an operation on the sensitive object, displaying warning information.

4. The method of claim 2, further comprising:
   in response to detecting an operation on the sensitive object, preventing the operation on the sensitive object.

5. The method of claim 3, wherein the operation on the sensitive object comprises at least one of:
   access, modify and delete.

6. The method of claim 1, wherein the second object is dynamically obtained from the first object via the first relationship.

7. The method of claim 1, wherein the strict correlation comprises at least one of:

create relationship, load relationship, and reference relationship.

8. A system for data security, comprising:
one or more processors, one or more computer-readable memories, one or more computer-readable tangible storage devices, and program instructions stored on at least one of the one or more storage devices for execution by at least one of the one or more processors via at least one of the one or more memories comprising:
an obtaining unit configured to obtain, from a database stored in markup language, a first object which is set as a sensitive object, wherein the first object is a resource in a first extensive markup language (XML) document and comprises a uniform resource identifier (URI) that is associated with the resource in the first extensive markup language (XML) document, and obtain a second object, wherein the second object comprises at least a second extensive markup language (XML) document, and determining whether there is a relationship between the first object and the second object; and
a determining unit configured to set the second object as a sensitive object based on the first object being set as a sensitive object and in response to determining that the relationship represents that there is strict correlation between the second object and the first object, wherein the strict correlation comprises the second object referencing the first object.

9. The system of claim 8, wherein the program instructions further comprises:
an updating unit configured to update a list of monitored sensitive objects in response to setting the second object as a sensitive object.

10. The system of claim 9, wherein the program instructions further comprises:
a warning unit configured to display warning information in response to detecting an operation on the sensitive object.

11. The system of claim 9, wherein the program instructions further comprises:
a preventing unit configured to prevent an operation on the sensitive object in response to detecting the operation on the sensitive object.

12. The system of claim 10, wherein the operation on the sensitive object comprises at least one of:
access, modify and delete.

13. The system of claim 8, wherein the second object is dynamically obtained from the first object via the first relationship.

14. The system of claim 8, wherein the strict correlation comprises at least one of:
create relationship, load relationship, and reference relationship.

15. A computer program product for data security, the computer program product comprising:
one or more computer-readable storage devices and program instructions stored on at least one of the one or more tangible storage devices, the program instructions executable by a processor, the program instructions comprising:
program instructions to obtain, from a database stored in markup language, a first object which is set as a sensitive object, wherein the first object is a resource in a first extensive markup language (XML) document and comprises a uniform resource identifier (URI) that is associated with the resource in the first extensive markup language (XML) document;
program instructions to obtain a second object, wherein the second object comprises at least a second extensive markup language (XML) document, and determining whether there is a relationship between the first object and the second object; and
program instructions to set the second object as a sensitive object based on the first object being set as a sensitive object and in response to determining that the relationship represents that there is strict correlation between the second object and the first object, wherein the strict correlation comprises the second object referencing the first object.

16. The computer program product of claim 15, further comprising:
in response to setting the second object as a sensitive object, updating a list of monitored sensitive objects.

17. The computer program product of claim 16, further comprising:
in response to detecting an operation on the sensitive object, displaying warning information.

18. The computer program product of claim 16, further comprising:
in response to detecting an operation on the sensitive object, preventing the operation on the sensitive object.

19. The computer program product of claim 17, wherein the operation on the sensitive object comprises at least one of:
access, modify and delete.

20. The computer program product of claim 15, wherein the second object is dynamically obtained from the first object via the first relationship.

* * * * *